(12) United States Patent
Godridge et al.

(10) Patent No.: US 11,355,934 B2
(45) Date of Patent: Jun. 7, 2022

(54) DUAL TRANSFORMER TURBINE

(71) Applicant: Siemens Gamesa Renewable Energy A/S, Brande (DK)

(72) Inventors: Paul Godridge, Cheadle (GB); Matthew Robert Anthony Kilpin, Brentwood (GB); Brian Rasmussen, Give (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/972,056

(22) PCT Filed: Jun. 4, 2019

(86) PCT No.: PCT/EP2019/064403
§ 371 (c)(1),
(2) Date: Dec. 4, 2020

(87) PCT Pub. No.: WO2019/233974
PCT Pub. Date: Dec. 12, 2019

(65) Prior Publication Data
US 2021/0242685 A1    Aug. 5, 2021

(30) Foreign Application Priority Data

Jun. 8, 2018 (EP) .................................. 18176819

(51) Int. Cl.
*F03D 9/00* (2016.01)
*H02P 9/04* (2006.01)
(Continued)

(52) U.S. Cl.
CPC ............. *H02J 3/381* (2013.01); *F03D 9/255* (2017.02); *H02J 3/38* (2013.01); *H02J 3/46* (2013.01);
(Continued)

(58) Field of Classification Search
CPC ..... F03D 9/255; H02J 3/38; H02J 3/46; H02J 2300/28; H02K 21/48
See application file for complete search history.

(56) References Cited

U.S. PATENT DOCUMENTS 425,470 A * 4/1890 Thomson .................. H02J 3/38
307/69
5,498,954 A * 3/1996 Bassett ..................... G05F 1/20
323/340

(Continued)

FOREIGN PATENT DOCUMENTS

EP    2 947 467 A1    11/2015
ES    2 325 844 A1     9/2009

OTHER PUBLICATIONS

European Search Report and Written Opinion of the European Searching Authority dated Oct. 18, 2018 for Application No. 18176819.3.
(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

Provided is an arrangement for producing electric energy, including: a generator having plural winding sets; plural converters each connected to one of the winding sets; at least two transformers, each connected at a low voltage side to output terminal of at least one converter; and a control portion connected to control the converters.

16 Claims, 2 Drawing Sheets

Figure 1:
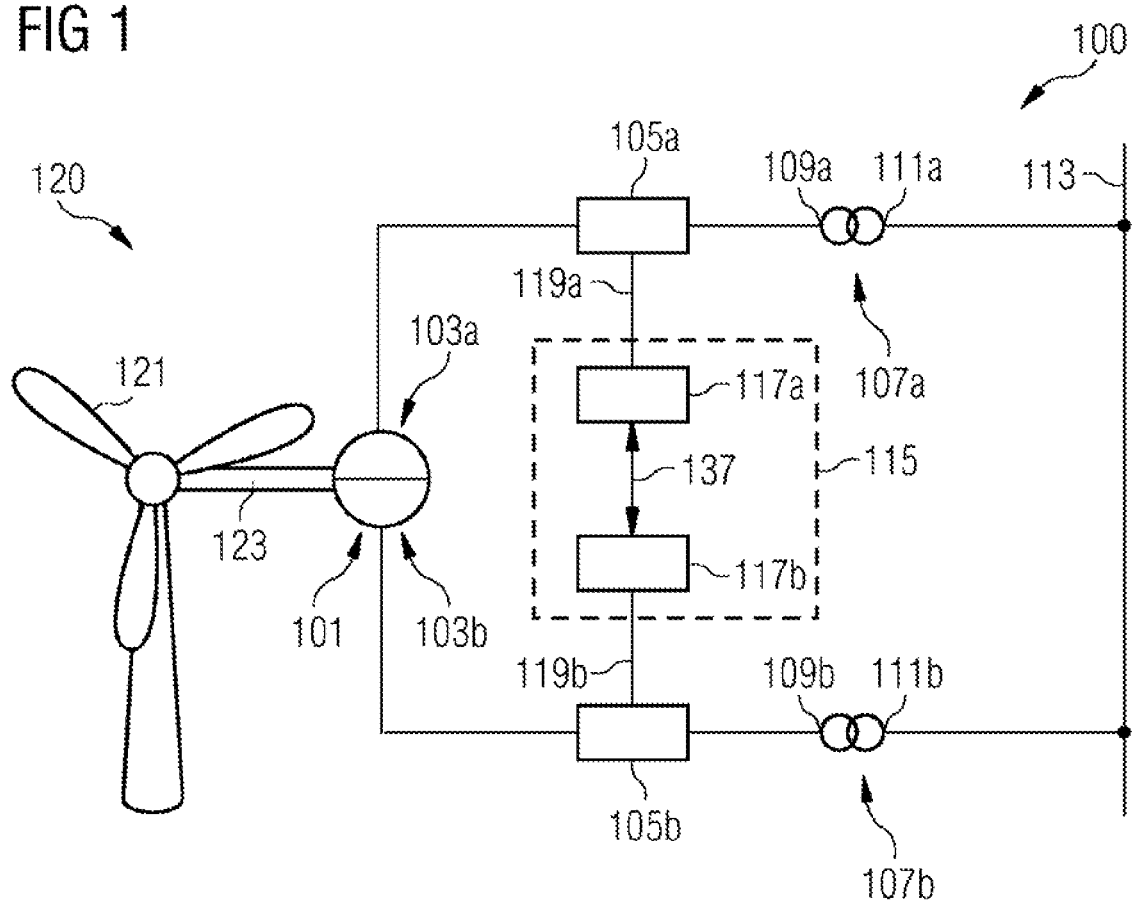

(51) Int. Cl.
*H02J 3/38* (2006.01)
*F03D 9/25* (2016.01)
*H02J 3/46* (2006.01)
*H02K 3/28* (2006.01)
*H02K 7/18* (2006.01)
*H02K 16/04* (2006.01)
*H02K 19/36* (2006.01)
*H02K 21/48* (2006.01)

(52) U.S. Cl.
CPC ............ *H02K 3/28* (2013.01); *H02K 7/1838* (2013.01); *H02K 16/04* (2013.01); *H02K 19/365* (2013.01); *H02J 2300/28* (2020.01); *H02K 21/48* (2013.01)

(56) References Cited

U.S. PATENT DOCUMENTS

| | | | | |
|---|---|---|---|---|
| 6,946,750 | B2* | 9/2005 | Wobben | H02J 3/46 290/44 |
| 7,102,248 | B2* | 9/2006 | Wobben | H02J 3/381 290/44 |
| 8,097,970 | B2* | 1/2012 | Hyvarinen | H02J 3/386 290/44 |
| 8,803,348 | B2* | 8/2014 | Groendahl | H02K 3/28 290/44 |
| 8,841,872 | B2* | 9/2014 | Pasuri | H02J 3/005 318/500 |
| 9,306,473 | B2* | 4/2016 | Kjaer | H02M 5/458 |
| 9,379,552 | B2* | 6/2016 | Ritchey | H02K 7/116 |
| 10,826,349 | B2* | 11/2020 | Zhu | F03D 7/047 |
| 2004/0100102 | A1* | 5/2004 | Wobben | H02K 16/04 290/55 |
| 2006/0103137 | A1* | 5/2006 | Wobben | H02K 16/04 290/44 |
| 2006/0183137 | A1 | 8/2006 | Harper et al. | |
| 2017/0331295 | A1* | 11/2017 | Abeyasekera | F03D 9/255 |
| 2018/0034280 | A1* | 2/2018 | Pedersen | H01F 27/24 |
| 2021/0097141 | A1* | 4/2021 | Lillelund | G06N 5/022 |
| 2021/0242685 | A1* | 8/2021 | Godridge | F03D 9/255 |

OTHER PUBLICATIONS

International Search Report & Written Opinion for PCT/EP2019/064403 dated Aug. 19, 2019.

* cited by examiner

DUAL TRANSFORMER TURBINE

CROSS-REFERENCE TO RELATED APPLICATIONS

This application claims priority to PCT Application No. PCT/EP2019/064403, having a filing date of Jun. 4, 2019, which is based on EP Application No. 18176819.3, having a filing date of Jun. 8, 2018, the entire contents both of which are hereby incorporated by reference.

FIELD OF TECHNOLOGY

The following relates to an arrangement for producing electric energy and further relates to a wind turbine comprising the arrangement.

BACKGROUND

An electric generator may comprise one or more sets of windings, each providing for example three phases. A generator having two sets of three-phase windings has been used for a wind turbine. For each winding set of the two winding sets, a respective AC-DC-AC converter may be present. The combined output of the two converters may be supplied to a transformer of the wind turbine to transform the output voltage to a higher voltage to be supplied to a point of common coupling at which plural wind turbines are connected.

It has been observed that the conventional design of a wind turbine has disadvantages in terms of energy or power output. Thus, there may be a need for an arrangement for producing electric energy and there may be a need for a wind turbine, wherein a high amount of electric energy can be produced in a reliable and safe manner.

SUMMARY

According to an embodiment of the present invention it is provided an arrangement for producing electric energy, comprising: a generator having plural winding sets; plural converters each connected to one of the winding sets; at least two transformers, each connected at a low voltage side to output terminal of at least one converter; and a control portion connected to control the converters.

The generator may for example be a permanent magnet electric generator. The generator may comprise a stator comprising teeth alternating with slots which slots may harbour at least portions of the plural windings. Plural permanent magnets may be mounted at an inner or an outer rotor which may be rotatably supported relative to the stator comprising the windings. The generator may have for example two winding sets, three winding sets, four winding sets, five winding sets or even more winding sets, each winding set having plural wires for providing different phase of electricity. For each of the plural winding sets, a converter may be provided and connected to the respective winding set.

The winding sets may be wound partly within the slots of the stator in a particular winding scheme. The winding scheme may for example be compatible with a star configuration, in which one end of plural wires of one set (or channel) of windings is electrically connected to each other. The winding scheme may for example be compatible with a delta configuration. Wires of different sets (or channels) of windings may mutually be electrically isolated from each other.

Furthermore, plural coils may be formed partly within the slots and leading around the teeth of the stator. Other ends of the wires of each set, for example three wires, may be electrically connected to three input terminals of the respective converter.

The converters may convert a variable frequency alternating current power stream to a substantially fixed frequency alternating current power stream. The converters may comprise plural controllable switches, such as IGBTs which may be connected as half-bridges between two DC terminals. In particular, each converter may comprise a generator side portion (in particular AC-DC converter portion), a DC link and a grid side converter portion (in particular DC-AC converter portion). The controllable switches may be controlled by appropriate gate signals being supplied by the control portion.

The arrangement may comprise two transformers, three transformers, four transformers or even more transformers. Each of the transformers is connected to at least one of the converters. For example, each of the transformers may be connected to exactly one converter or for example each of the transformers may be connected to exactly two converters or even more converters. For example, each of the transformers may be connected to a same number of converters, such as one, two, three or even more. Furthermore, a first of the two transformers may be connected to for example one converter while another of the two transformers may for example be connected to two converters or three converters or even more converters.

The transformers may be adapted to transform the output power stream of the connected converter(s) to a higher voltage, for transmission of the power having less power loss. The transformers may comprise a primary coil at the low voltage side and an inductively coupled secondary coil at the high voltage side.

The control portion may be configured in a number of different ways. The control portion may for example comprise for one or more converters a respective converter controller. The control portion may be adapted in a master-slave configuration, in which a master converter controller may supply or derive control signals for the slave converter controller and may provide or transmit the control signal to the respective slave converter controller(s).

By having at least two transformers in the arrangement, the power output of the arrangement for producing electric power may be enhanced. Further, the control portion may at least partly comprise conventionally available control modules and may apply at least partly conventionally available control algorithms.

According to an embodiment of the present invention, each winding set comprises plural wires, each wire providing one phase and being partly arranged within slots of a stator of the generator. The plural wires may be arranged within the slots (for example between teeth) of the stator of the generator. Thereby, conventional generators are supported.

When the wires are wound in a delta configuration, the current in each phase of the converter will be made from a combination of currents from multiple generator winding phases.

According to an embodiment of the present invention, each of the converters is an AC-DC-AC converter. Thereby, conventionally available converters in particular comprising controllable switches, such as IGBTs, may be supported.

According to an embodiment of the present invention, the control portion comprises plural converter controllers, the number of converter controllers being equal to a number of transformers, each converter controller being connected to control at least one of the plural converters.

For each of the at least two transformers, a respective converter controller may be present, and which may be connected to control those converters whose output terminals are connected to the respective transformer. Thereby an effective control may be achieved, in particular at least approximately balancing power output or active current through each of the transformers. Thereby, the converters may for example be grouped into sets of converters, each set of the converter being connected to a low voltage side of a particular one of the at least two transformers. Each set of converters may be controlled by a respective converter controller. Thereby, the complexity of the arrangement may be reduced.

Each of the converter controllers may comprise a division module which may divide respective demand values (of electric output) by the number of connected converters. The division module may in other embodiments be implemented as a central additional module which may derive and supply respective divided demand values to the converters.

According to an embodiment of the present invention, the control portion is configured to perform voltage control in which a demand voltage value at the low voltage side or the high voltage side of the transformers is achieved; and, in other times, to perform power control, in particular active power control, in which a demand power value is output by the entire arrangement; and, in other times, to perform grid fault ride through in case of sudden and/or strong deviations of the grid voltage from a nominal grid voltage.

Voltage control may allow adjusting the voltage at the low voltage side or the high voltage side of the transformers to a desired value, i.e. the demand voltage value. Voltage control may involve injecting reactive current in dependence of a deviation of the actual voltage value from the demand voltage value. Thereby, conventionally applied methods may be utilized.

During power control, the power output of the whole arrangement may be adjusted to comply with the demand power value, in particular demand active power value and/or demand reactive power value. For achieving the demand power value (for example at the low voltage side of the transformers or the sum of the power outputs at the low voltage side of all transformers of the arrangement) an active current may be appropriately adjusted. Or the power which is delivered by each set of converters may appropriately be adjusted such that the sum equals the demand power value.

According to an embodiment of the present invention two main operating modes may be supported: ‚steady state' and GFRT. E.g. a direct steady state reactive current reference, rather than a low voltage voltage reference, may be received.

During a grid fault, the grid voltage may suddenly break down or may suddenly strongly increase. In those events, an energy producing facility is required to react in a particular manner, in order to avoid damage of components of the energy producing facility and/or grid components. Therefore, the arrangement is arranged to detect and appropriately react on grid faults to provide a secure and reliable ride through. Thereby, conventionally applied methods may be performed and implemented in the control portion. However, those conventionally available methods are now adapted for at least two transformers each being connected to a respective set of converters or at least one converter each.

According to an embodiment of the present invention, the arrangement further comprises a measurement module adapted to measure low voltage side voltage values, in particular for each phase, at the low voltage sides of each of the transformers; a processor adapted to derive an average voltage value as average of the low voltage side voltage values associated with all transformers.

The measurement module may also be adapted to measure output currents of each of the converters. All measurement signals may be supplied to the processor which may analyse the measurement values and derive the average voltage value, for example as an average of RMS values for each winding set. For example, for each winding set the mean of the squared voltages for each phase may be formed and the square root may be taken to thereby arrive at the RMS value (RMS: root mean square) of this particular winding set. Then the average of the RMS values of each or of all winding sets may be derived as arithmetic or geometric mean.

In other embodiments, the squares of the phase voltages at the low voltage side of a first transformer are summed and divided by the number of phases. The same is performed with the voltages present at all other input terminals at all other transformers. Then, the average (for example arithmetic average or geometric average) of all those RMS values is calculated, to arrive at the average voltage value. The average voltage value may thus reflect voltages at low voltage sides of all transformers. Thus, the average voltage value may be an appropriate feedback signal for example voltage control or grid fault ride through control or even also power control.

According to an embodiment of the present invention, the control portion is configured during voltage control: to use the average voltage value as a feedback value, wherein in particular average voltage value is used by at least one converter controller, in particular master converter controller as feedback value.

Thus, according to this embodiment, a single feedback value, namely the average voltage value, is used for the entire arrangement. In particular, not several different feedback values are utilized, thereby simplifying the arrangement, and ensuring reliable operation.

According to an embodiment of the present invention, the control portion, in particular a master converter controller, is configured during voltage control and/or grid fault ride through control: to derive, based on the average voltage value and the demand voltage value, a reactive current demand value, and/or to divide the reactive current demand value equally or unequally among the plural converters, wherein the plural converters perform their control based on the divided reactive current demand values.

If one converter channel which was running hot (for example) an unequal split may deliberately be chosen according to some thermal constraint (for example). In particular dividing the current between channels may be performed according to the channel's capability at that moment. Another possibility may be to divide the reactive current according to balancing the RMS currents in each channel. In order to have equal active power in each channel there may be unequal active currents then unequal reactive currents may be chosen to create equal RMS currents. Other division rules may be applied.

A deviation between the average voltage value and the demand voltage value may be supplied to a controller, such as a PID or PI controller, which may output the reactive current demand value. The different converters may then be commanded to each provide a portion of the reactive current demand value. Therefore, the reactive current demand value may be appropriately shared or divided among the present converters. In particular, the converters may be commanded to substantially output a same reactive current as any other converter or some or at least one converter is commanded to provide a higher reactive current than another converter. When the reactive current demand value is equally divided or shared among the converter, the rating of the converter may be complied with in an easy manner.

In other embodiments the reactive current demand value may unequally divided or shared among the converter, e.g. depending on state and/or capacity/rating of the converters/winding sets.

According to an embodiment of the present invention, during voltage control and/or grid fault ride through control the control is such (for example by the control portion or the converter controllers) that each converter substantially outputs a same reactive current as any other converter.

According to an embodiment of the present invention, during power control the control is such that each converter substantially outputs same active power as any other converter.

Also, when each converter substantially outputs a same active power as any other converter, the ratings of the converters may be complied with and may be the same, while not requiring especially high rated converters. All converters may be configured in a similar or even same manner.

Alternatively, the control portion, in particular a master converter controller, is configured during power control: to derive, based on the demand power value and average voltage value, an active current demand value, and to equally or unequally divide the active current demand value among the plural converters, wherein the plural converters perform their control based on the divided active current demand values.

The active current demand value may be derived such that the product of the thereby derived active current demand value taken with the average voltage value results in the demand power value. Thereby, an alternative division of particular power portions or current portions among the converters is provided.

In particular, according to an embodiment of the present invention, during power control the control is such that each converter substantially outputs substantially same active current as any other converter.

According to an embodiment of the present invention, a high voltage side of each transformer is connectable (in particular connected) to a utility grid or a common connection point to which plural energy producing facilities are connected. Thereby, the arrangement may constitute, or support conventionally required electrical properties.

According to an embodiment of the present invention, the generator has four, in particular three-phase, winding sets; wherein a first transformer of the two transformers is connected at a low voltage side to output terminals of first two converters, wherein a second transformer of the two transformers is connected at a low voltage side to output terminals of second two converters, wherein the control portion comprises one master converter controller connected for controlling the first two converters and one slave converter controller connected for controlling the second two converters.

Thereby, a high power output provided in a reliable and safe manner may be achieved. In particular, the two turbine transformers may be connected together at the grid medium voltage output terminals of the turbine each with its own separate low voltage circuit within the turbine. Each of the two transformer low voltage terminals is connected to two electrically independent converter channels. Thus, they are four channels of electrically independent converters in total. Each of the four channels of converters is connected to a separate set of electrical windings of the turbine generator. Thus, there is a single four-channel generator according to this embodiment. Furthermore, the four converter channels are coordinated by the control portion including the operation in which one or more converter channels is disabled. If one or more converter channels is disabled, the kind of division or sharing of reactive current values among the converters may be changed to not include the faulty converter or the faulty channel or winding set of the generator.

The arrangement may also support a failure in one or more of the winding sets. In this case, the respective converter may be disconnected or may be disabled during any control, such as voltage control, power control or grid fault ride through control. Furthermore, the control signals indicative of the power or current to be output by the respective converter may be shared or divided only among those converters which are connected to intact winding sets.

According to an embodiment of the present invention it is provided a wind turbine comprising a wind turbine rotor having plural rotor blades and an arrangement according to one of the preceding embodiments, wherein a generator rotor of the generator is connected to the wind turbine rotor.

The wind turbine may comprise a wind turbine tower, a nacelle mounted on top of the tower, the nacelle harbouring the generator and in particular the entire arrangement for producing electric energy.

The aspects defined above and further aspects of the present invention are apparent from the examples of embodiment to be described hereinafter and are explained with reference to the examples of embodiment.

BRIEF DESCRIPTION

Figure 2:
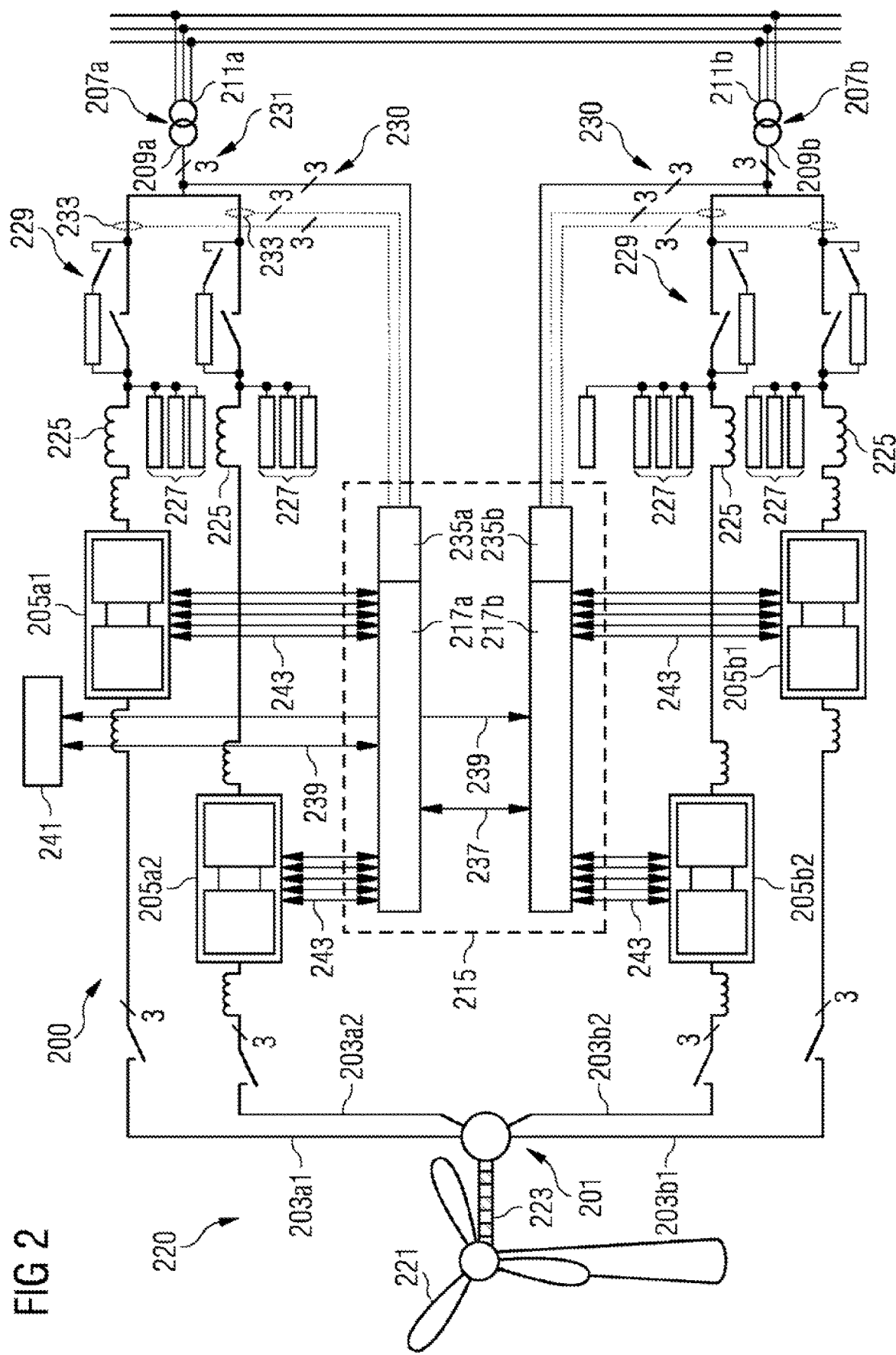

Some of the embodiments will be described in detail, with reference to the following figures, wherein like designations denote like members, wherein:

FIG. 1 schematically illustrates an arrangement for producing electric energy according to an embodiment of the present invention including two converters and two transformers; and FIG. 2 schematically illustrates an arrangement for producing electric energy according to an embodiment of the present invention including four converters and two transformers.

DETAILED DESCRIPTION

The illustration in the drawings is in schematic form. It is noted that in different figures, similar or identical elements are provided with the same reference signs or with reference signs, which are different from the corresponding reference signs only within the first digit.

The arrangement 100 schematically illustrated in FIG. 1 for providing electric energy comprises an electric generator 101, in particular a generator 101 having two winding sets 103*a*, 103*b*, each comprising three wires partially arranged within slots of a stator of the generator 101 and partly wound around teeth of the stator of the generator 101. Wires of different winding sets 103*a* and 103*b* are electrically disconnected from each other. Wires of a same winding set, e.g. 103*a* or 103*b*, are electrically disconnected from each other at at least one respective end of the wires. Each of the winding sets may for example comprise three wires providing three phases.

The arrangement 100 further comprises a first converter 105a having its input terminals connected with the first winding set 103a. Furthermore, the arrangement 100 comprises a second converter 105b whose input terminals are connected to the second winding set 103b.

The arrangement 100 further comprises a first transformer 107a connected with its low voltage side 109 to output terminals of the first converter 105a. The arrangement further comprises a second transformer 107b whose low voltage side 109b is connected to output terminals of the second converter 105b. The respective high voltage sides 111a, 111b of the first transformer 107a and the second transformer 107b, respectively, are connected to a connection bar or a connection cable 113 which may for example be connected to a point of common coupling to which plural wind turbines are connected.

The arrangement 100 further comprises a control portion 115 connected to control the converters 105a, 105b. In the illustrated embodiment, the control portion 115 is implemented having or comprising a first converter controller 117a and a second converter controller 117b controlling the first converter 105a and the second converter 105b, respectively, using signal lines 119a, 119b. The converters 105a, 105b are AC-DC-AC converters. The number of converter controllers, i.e. the controllers 117a, 117b, are equal to the number of transformers, namely two.

The arrangement 100 is a portion of a wind turbine 120 which comprises a wind turbine rotor 123 having plural rotor blades 121 connected thereto, wherein the wind turbine rotor 123 is connected to a generator rotor of the generator 101.

FIG. 2 schematically illustrates an arrangement 200 included in a wind turbine 220 according to an embodiment of the present invention. Reference signs denoting same or similar elements in structure and/or function are labelled with reference signs differing only in the first digit in FIGS. 1 and 2.

The arrangement 200 illustrated in FIG. 2 comprises a four channel generator 201, thus a generator having four independent winding sets 203a1, 203a2, 203b1 and 203b2. The arrangement further comprises the converters 205a1 and 205a2 connected to the winding sets 203a1 and 203a2, respectively. Further, the arrangement comprises the converters 205b1 and 205b2 connected to the second winding sets 203b1 and 203b2, respectively. Output terminals of the converters lead to inductances 225 and a filter block 227 for filtering out e.g. harmonics and/or interharmonics of a grid frequency, such as 50 Hz or 60 Hz, and/or harmonics and/or interharmonics of a converter switching frequency. Further downstream, respective switches 229 are provided.

The outputs of the first converters 205a1, 205a2 are combined and commonly connected to the low voltage side 209a of a first transformer 207a whose high voltage side 211a is connected to the connection bar 213. Similarly, the second converters 205b1, 205b2 are, via the inductances and filters 225, 227 and switches 229, connected to the low voltage side 209b of the second transformer 207b. The high voltage side 211b of the second transformer 209b is also connected to the common connection bar or cable 213.

The control section 215 of the arrangement 200 is implemented by a first converter controller 217a controlling the first converters 205a1 and 205a2. Further, the control section 215 comprises a second converter controller 217b controlling the second converters 205b1 and 205b2. The arrangement 200 further comprises a measurement module 230 which is adapted to measure using sensors 231 low voltage side voltage values at the low voltage side 209a, 209b of each of the transformers 207a, 207b, respectively. Furthermore, current measurement devices 233 may measure currents output from each of the converters 205a1, 205a2, 205b1, 205b2 and provide respective measurement signals to a grid module or processor 235a and 235b which may be integrated into the first converter controller 217a and the second converter controller 217b or may be implemented in different modules.

Alternatively or additionally current sensors measuring the current may e.g. be provided in reactor 225. These currents may be controlled in embodiments of the present invention, rather than those measured by sensors 233.

The converter controllers 217a and 217b may communicate with each other using communication lines 237. Further, the converter controllers may communicate using communication lines 239 with a main computer or park pilot 241.

Voltage and/or power references may be decided by a combination of park pilot and turbine controller.

The park pilot 241 may for example provide demand values such as a power demand value or a voltage demand value. Using the demand values and the actually measured values, the controller may appropriately control the respective converters by supplying gate control signals 243 to controllable switches within the converters. Thereby, the controller 215 as such may balance the active power in each channel whenever possible. Further, the average of the voltages measured at the low voltage terminals 209a, 209b of the two transformers 207a, 207b are used to derive a single grid voltage feedback which is used for grid voltage control and for detecting and responding to grid events as defined in the grid codes.

As is illustrated in FIG. 2, there are two converter controllers each controlling two converter channels and there is an inter-converter fibre 237 over which the two controllers 217a, 217b may communicate with each other. The result of this implementation detail is that each of the four converter channels 205a1, 205a2, 205b1, 205b2 could in principle communicate directly with any other converter channel. Data can be exchanged between channels at the same rate at which controlled features are executed.

The block diagram in FIG. 2 also shows that the voltages on the low voltage terminals of each transformer are being measured at measurement points 231 using measurement devices. Further, also the currents flowing into the transformer 207a, 207b are measured using the current measurement devices 233. A separate grid module 235a, 235b may be responsible for collecting and processing these transformer voltage and current measurements and communicate the results to its local converter controllers. The grid module may be an implementation of a processor according to an embodiment of the present invention.

One converter controller, for example converter controller 217a, may be assigned the role of a "master channel". The master channel may be provided with a voltage feedback that is the average of the RMS voltages measured by each of the grid modules and is therefore the average of the voltages of the two transformers 207a, 207b:

$$V_{gridaverage} = (V_{gridmodule1} + V_{gridmodule2})/2.$$

The master channel may now use that voltage feedback in a grid AC voltage controller whose output is reactive current demand. Such an AC voltage controller may be a standard feature of currently used converters and turbines. That reactive current demand may now be shared e.g. equally between the four converter channels in a master and three slave arrangement. Or in the case of running fewer than four channels, such as when one channel is faulty, that reactive current demand can be shared equally between the available channels. This is in turn may mean that the voltages of the two transformers would not be equal if a different number of channels were active on each transformer. But instead we would have equal reactive currents in each channel and the average grid voltage would match the reference or voltage demand value. The turbine receives a single grid voltage reference and reports a single grid voltage feedback and so the signals that this feature produces will perfectly support the standard external interface from the turbine.

Similarly, the master channel receives a demand to deliver power to the grid. This power demand may be distributed equally between the available converter channels such that they all have equal power in a master plus three slave arrangement.

An alternative would be for the master channel to decide the total active current needed, based on the requested total power demand and the measured average grid voltage. If this design option were taken, the current in the network bridge of each converter channel would be equal. But the power in each converter channel would not balance if the individual grid voltages of the two transformers did not match and therefore the generator bridge power and current of each channel would not match. Therefore, the design option taken is to balance active power, not network bridge active current. But embodiments of the invention disclosed here supports either option.

The converter may also have some features which detect and act upon large transients in grid voltage. Such features may be referred to grid fault ride through or GFRT and may include both sudden increase and sudden decrease in grid voltage reactions. During such events, the response of the turbine (and therefore response of the converters) may be defined by whatever grid code that turbine is configured to be compliant with. Again, a single average grid voltage feedback may be utilized so that there may be a single point decision on whether or not the grid voltage deviation is large enough to activate one of various grid event features. Furthermore, the single average grid voltage feedback may be used to decide the reactive current that is injected into the grid fault or into the grid, as well as contribute to the calculation of the active current and/or power that should be provided by each converter channel.

Embodiments of the present invention provide an energy producing facility having two or more transformers. Furthermore, a single signal may be created representing the average low voltage side voltage of the two or more transformers. This single "measurement" may be used as feedback to converter features whose objective is to control grid voltage or respond to deviations in grid voltage. Thereby, several advantages may be achieved:

(a) a clear and unambiguous signal is provided, from which it can be determined whether the turbine as a whole needs to respond to a grid event or not. Also, this clear and unambiguous signal will also be used to determine what mix of active and reactive current should be injected into the grid.

(b) Equal reactive current in each converter channel may be adjusted at all time, even in reduced converter operation where the transformer voltages can be unequal. If this wouldn't be done and used an independent AC voltage controller for each transformer low voltage terminals, then the reactive current in each channel would be extremely unequal in reduced converter operation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An arrangement comprising:
a generator having a plurality of winding sets, the generator driven by a prime mover;
a plurality of converters, each converter connected to one of the plurality of winding sets;
at least two transformers, each transformer having a low voltage side connected to an output terminal of at least one of the plurality of converters;
a measurement module adapted to measure voltage values at the low voltage sides of each transformer;
a processor adapted to derive an average voltage value as an average of the voltage values associated with the at least two transformers; and
a control portion connected to control the plurality of converters based on the average voltage value.

2. The arrangement according to claim 1, wherein the plurality of winding sets comprise a plurality of wires, each wire providing one phase and being partly arranged within slots of a stator of the generator.

3. The arrangement according to claim 1, wherein the plurality of converters are at least one of: an AC-DC-AC and an AC-AC converter.

4. The arrangement according to claim 1, wherein the control portion comprises:
a plurality of converter controllers, each converter controller being connected to control at least one of the plurality of converters; or
a single converter controller configured to control each of the plurality of converters.

5. The arrangement according to claim 1, wherein the control portion is configured:
to perform voltage control in which a demand voltage value at the low voltage side of the transformers is achieved; and, in other times,
to perform power control, in which a demand power value is output by the entire arrangement; and, in other times,
to perform grid fault ride through in case of sudden and/or strong deviations of the grid voltage from a nominal grid voltage.

6. The arrangement according to claim 2,
wherein the measurement module is adapted to measure voltage values for each phase at the low voltage sides of each of the transformers,
wherein the processor is adapted to derive the average voltage value as an average of the voltage values for each phase associated with the at least two transformers.

7. The arrangement according to claim 5, wherein the control portion is configured during voltage control:
to use the average voltage value as a feedback value.

8. The arrangement according to claim 5, wherein the control portion is configured during voltage control and/or grid fault ride through control:
to derive, based on the average voltage value and the demand voltage value, a reactive current demand value, and to divide the reactive current demand value among the plurality of converters, wherein the plurality of converters are controlled based on the divided reactive current demand values.

9. The arrangement according to claim 5, wherein during voltage control and/or grid fault ride through each converter outputs a substantially identical reactive current as any other converter.

10. The arrangement according to claim 5, wherein during power control each converter outputs a substantially identical active power as any other converter.

11. The arrangement according to claim 5, wherein the control portion is configured during power control:
to derive, based on the average voltage value, an active current demand value, and
to equally or unequally divide the active current demand value among the plurality of converters, wherein the plurality of converters are controlled based on the divided active current demand values.

12. The arrangement according to claim 11, wherein during power control each converter outputs a substantially identical active current as any other converter, wherein a total RMS current is shared equally among the plurality of converters.

13. The arrangement according to claim 1, wherein a high voltage side of each transformer is connectable to a utility grid or a common connection point to which a plurality of energy producing facilities are connected.

14. The arrangement according to claim 1,
wherein the generator has four three-phase winding sets;
wherein a first transformer of the at least two transformers is connected at a low voltage side to output terminals of at least two converters of the plurality of converters,
wherein a second transformer of the at least two transformers is connected at a low voltage side to output terminals of at least two converters of the plurality of converters,
wherein the control portion comprises one master converter controller connected for controlling the at least two converters associated with the first transformer and one slave converter controller connected for controlling the at least two converters associated with the second transformer.

15. A wind turbine, comprising:
a wind turbine rotor having a plurality of rotor blades; and
an arrangement according to claim 1, wherein a generator rotor of the generator is connected to the wind turbine rotor.

16. The arrangement according to claim 11, wherein during power control each converter outputs a substantially different active current as any other converter, wherein a total RMS current is shared equally among the plurality of converters.

* * * * *